United States Patent
Sone et al.

(10) Patent No.: US 10,351,645 B2
(45) Date of Patent: Jul. 16, 2019

(54) COPOLYMER, POLYMER COMPOSITION, AND CROSSLINKED POLYMER

(71) Applicant: JSR CORPORATION, Minato-ku (JP)

(72) Inventors: Takuo Sone, Tokyo (JP); Shouichi Matsumoto, Tokyo (JP); Ayumi Watanabe, Tokyo (JP); Ayumi Hara, Tokyo (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 15/555,228

(22) PCT Filed: Jan. 29, 2016

(86) PCT No.: PCT/JP2016/052779
§ 371 (c)(1),
(2) Date: Sep. 1, 2017

(87) PCT Pub. No.: WO2016/139996
PCT Pub. Date: Sep. 9, 2016

(65) Prior Publication Data
US 2018/0051109 A1 Feb. 22, 2018

(30) Foreign Application Priority Data
Mar. 4, 2015 (JP) ................. 2015-042701

(51) Int. Cl.
*C08F 210/06* (2006.01)
*C08F 210/00* (2006.01)
(Continued)

(52) U.S. Cl.
CPC .......... *C08F 210/06* (2013.01); *C08F 210/00* (2013.01); *C08F 236/04* (2013.01);
(Continued)

(58) Field of Classification Search
CPC .... C08F 210/00; C08F 236/04; C08F 210/06; C08K 3/06; C08K 3/16; C08K 5/00;
(Continued)

(56) References Cited

U.S. PATENT DOCUMENTS 3,652,518 A * 3/1972 Kawasaki et al. ........ C08F 4/12
526/114
4,189,558 A 2/1980 Witte et al.
(Continued)

FOREIGN PATENT DOCUMENTS

DE 27 06 118 A1 8/1978
EP 0 039 805 A1 11/1981
(Continued)

OTHER PUBLICATIONS

International Search Report dated Mar. 29, 2016 in PCT/JP2016/052779 filed Jan. 29, 2016.
(Continued)

*Primary Examiner* — William K Cheung
(74) *Attorney, Agent, or Firm* — Oblon, McClelland, Maier & Neustadt, L.L.P.

(57) ABSTRACT

A copolymer having a structural unit derived from a conjugated diene compound and a structural unit derived from an α-olefin having 3 to 8 carbon atoms, wherein the copolymer has a melting point within a temperature range of 0 to 10° C. and has a fusion enthalpy of 5 J/g or more as measured on a differential scanning calorimeter under the following conditions. Conditions: (1) cooling from 200° C. to −150° C. at a rate of 10° C./min; (2) retaining at −150° C. for 1 minute; and (3) heating from −150° C. to 200° C. at a rate of 20° C./min.

10 Claims, 2 Drawing Sheets

(51) Int. Cl.

| | | |
|---|---|---|
| C08F 236/04 | (2006.01) | |
| C08K 3/06 | (2006.01) | |
| C08K 3/16 | (2006.01) | |
| C08K 5/00 | (2006.01) | |
| C08L 9/00 | (2006.01) | |
| C08L 23/02 | (2006.01) | |
| C08L 47/00 | (2006.01) | |
| C08K 3/22 | (2006.01) | |
| C08K 5/09 | (2006.01) | |

(52) U.S. Cl.
CPC ............. *C08K 3/06* (2013.01); *C08K 3/16* (2013.01); *C08K 3/22* (2013.01); *C08K 5/00* (2013.01); *C08K 5/09* (2013.01); *C08L 9/00* (2013.01); *C08L 23/02* (2013.01); *C08L 47/00* (2013.01); *C08K 2003/2296* (2013.01)

(58) Field of Classification Search
CPC ... C08K 5/09; C08K 2003/2296; C08L 23/02; C08L 47/00; C08L 9/00
USPC .................................................. 526/348, 335
See application file for complete search history.

(56) References Cited

U.S. PATENT DOCUMENTS 4,378,455 A 3/1983 Kawasaki et al.

| 2012/0264883 | A1* | 10/2012 | Pellegatti | C08L 23/16 |
| | | | | 525/240 |
| 2014/0005321 | A1 | 1/2014 | Horikawa et al. | |
| 2014/0005327 | A1 | 1/2014 | Horikawa et al. | |
| 2015/0080525 | A1 | 3/2015 | Matsushita et al. | |

FOREIGN PATENT DOCUMENTS

| GB | 1 582 414 A | 1/1981 |
| JP | 47-8612 B1 | 3/1972 |
| JP | 47-16184 B1 | 5/1972 |
| JP | 55-110107 A | 8/1980 |
| JP | 2001-213917 A | 8/2001 |
| JP | 2012-12542 A | 1/2012 |
| JP | 2012-162629 A | 8/2012 |
| JP | 2014-37499 A | 2/2014 |
| WO | 2013/132849 A1 | 9/2013 |

OTHER PUBLICATIONS

Extended European Search Report dated Nov. 15, 2018 in Patent Application No. 16758692.4, 6 pages.

Charles J. Carman, "The Determination of an Alternating Monomer Sequence Distribution in Propylene-Butadiene Copolymers Using Carbon-13 Nuclear Magnetic Resonance", Macromolecules, vol. 7, No. 6, Nov.-Dec. 1974, pp. 789-793.

* cited by examiner

COPOLYMER, POLYMER COMPOSITION, AND CROSSLINKED POLYMER

This application is a national stage of PCT International Application No. PCT/JP2016/052779 filed in Japan on Jan. 29, 2016, which claims priority Japanese Patent Application No. 2015-042701 filed in Japan on Mar. 4, 2015, the entire contents of which are hereby incorporated herein by reference.

TECHNICAL FIELD

The present invention relates to a copolymer, a polymer composition, and a crosslinked polymer. More specifically, it relates to a novel copolymer obtained by polymerization using a conjugated diene compound and an α-olefin, and the like.

BACKGROUND ART

Conventionally, various copolymers obtained by polymerizing a conjugated diene compound and an α-olefin have been known. For example, in Patent Document 1, it is disclosed to obtain a conjugated diene compound/α-olefin alternating copolymer by bringing butadiene into contact with an α-olefin in a liquid phase in the presence of a catalyst composed of an organoaluminum compound, vanadium (IV) chloride, and a compound having a carbonyl group or a cyano group.

RELATED ART

Patent Document

Patent Document 1: JP-B-S47-8612

SUMMARY OF INVENTION

Problems to be Solved by the Invention

With respect to the conventional conjugated diene compound/α-olefin copolymer, mechanical strength of the crosslinked polymer obtained by crosslinking the copolymer is insufficient. Thus, it is an actual situation that the copolymer has not yet been practically used.

The present invention has been made in view of the above problem, and it is an object to provide a conjugated diene compound/α-olefin copolymer for obtaining a crosslinked polymer having excellent mechanical strength.

Means for Solving the Problems

The present inventors have studied regularity control of polymer structures and can obtain a novel copolymer capable of solving the above problem. Thus, they have accomplished the present invention. Specifically, there are provided the following copolymer, polymer composition, and crosslinked polymer.

[1] A copolymer having a structural unit derived from a conjugated diene compound and a structural unit derived from an α-olefin having 3 to 8 carbon atoms, wherein the copolymer has a melting point within a temperature range of 0 to 10° C. and has a fusion enthalpy of 5 J/g or more as measured on a differential scanning calorimeter under the following conditions:

Conditions:
(1) cooling from 200° C. to −150° C. at a rate of 10° C./min;
(2) retaining at −150° C. for 1 minute; and
(3) heating from −150° C. to 200° C. at a rate of 20° C./min.
[2] The copolymer described in [1] above, which is an alternating copolymer of the structural unit derived from the conjugated diene compound and the structural unit derived from the α-olefin copolymer.
[3] A polymer composition comprising the copolymer described in [1] or [2] above and a crosslinking agent.
[4] A crosslinked polymer obtained by crosslinking the polymer composition described in [3] above.

Effects of the Invention

By crosslinking the above copolymer, a crosslinked polymer having excellent mechanical strength (particularly tensile strength) is obtained. Accordingly, use application of a conjugated diene compound/α-olefin copolymer is expanded and thus it is suitable.

EMBODIMENTS FOR CARRYING OUT THE INVENTION

Figure 1:
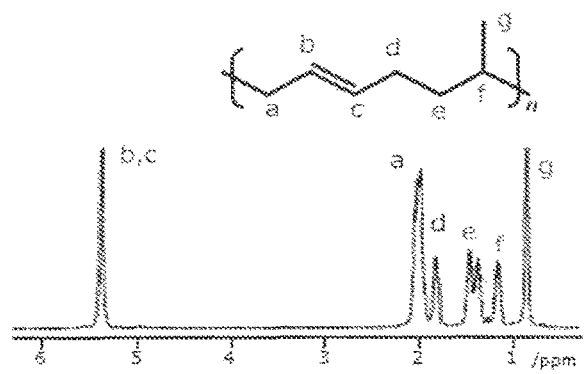
FIG. 1 $^1$H-NMR spectrum of the copolymer of Example.

The following will describe the copolymer, polymer composition, and crosslinked polymer of the present disclosure.
<Copolymer>
The copolymer of the present disclosure has a structural unit (X) derived from a conjugated diene compound and a structural unit (Y) derived from an α-olefin having 3 to 8 carbon atoms.
[Conjugated Diene Compound]
Examples of the conjugated diene compound that forms the structural unit (X) include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, 2-chloro-1,3-butadiene, and the like. Of these, 1,3-butadiene, isoprene, and 2,3-dimethyl-1,3-butadiene are preferred, and 1,3-butadiene is more preferred. Incidentally, the structural unit (X) that the copolymer of the present invention has may be one kind or two or more kinds.
[α-Olefin]
The α-olefin that forms the structural unit (Y) is not particularly limited as long as it is an alkene having 3 to 8 carbon atoms and having a carbon-carbon double bond at the α-position and examples thereof include propylene, 1-butene, 1-pentene, 1-hexene, 1-heptene, 1-octene, and the like. Of these, propylene and 1-butene are preferred, and propylene is more preferred. Incidentally, the structural unit (Y) that the copolymer of the present invention has may be one kind or two or more kinds.

The above copolymer has the physical properties of the following (p1) and (p2).
(p1) Regarding Melting Point
The copolymer has a melting point within a temperature range of 0 to 10° C. When the melting point is lower than 0° C., stretch crystallinity decreases and there is a concern that the mechanical strength (tensile strength) of the crosslinked polymer obtained by crosslinking the copolymer is lowered. Moreover, when the melting point exceeds 10° C., there is a concern that the rubber elasticity of the crosslinked polymer in the normal temperature range is reduced. From the viewpoint of improving the balance between the mechanical strength and rubber elasticity of the crosslinked polymer, the melting point of the copolymer preferably falls within a temperature range of 0 to 8° C., more preferably falls within a temperature range of 1 to 7° C. The melting point of the copolymer is a value indicated as the temperature at which a heat absorption amount resulting from crystal melting shows a peak in the melting curve obtained using a differential scanning calorimeter (DSC).

(p2) Regarding Melting Enthalpy

The copolymer has a melting enthalpy of 5 J/g or more as measured on DSC under conditions of (1) cooling from 200° C. to −150° C. at a rate of 10° C./min, (2) retaining at −150° C. for 1 minute, and (3) heating from −150° C. to 200° C. at a rate of 20° C./min. Here, when the melting enthalpy is less than 5 J/g, the content of strain-induced crystallization decreases, and there is a concern that the mechanical strength of the resulting crosslinked polymer is lowered. From the viewpoint of obtaining a crosslinked polymer having sufficiently high mechanical strength, the melting enthalpy of the copolymer is preferably 10 J/g or more, more preferably 15 J/g or more. Herein, the melting enthalpy is a value indicated as the sum of the heat absorption amount resulting from the crystal melting in the step of heating from −150° C. to 200° C. in the melting curve obtained using DSC under the above conditions.

The conjugated diene compound/α-olefin copolymer having such physical properties can be, for example, obtained by polymerizing monomers at least including a conjugated diene compound and an α-olefin having 3 to 8 carbon atoms in the presence of a polymerization catalyst.

Upon the polymerization, from the viewpoint of increasing the yield of the copolymer and from the viewpoint of sufficiently high mechanical strength and durability of the crosslinked polymer obtained by crosslinking the copolymer, it is preferred that the use ratio of the conjugated diene compound to the α-olefin having 3 to 8 carbon atoms (conjugated diene compound/α-olefin) is preferably 90/10 to 10/90 in mass ratio. The use ratio is more preferably 85/15 to 15 to 85, further preferably 80/20 to 20/80. Each of the conjugated diene compound and α-olefins may be used singly or may be used in combination of two or more thereof.

Incidentally, upon the polymerization, a monomer other than the conjugated diene compound and the α-olefins may also be used. Examples of the other monomer include aromatic vinyl compounds such as styrene and methylstyrene; (meth)acrylic compounds such as acrylonitrile, methyl (meth)acrylate, ethyl (meth)acrylate; and the like. The use ratio of the other monomer is preferably 10% by mass or less, more preferably 5% by mass or less, further preferably 1% by mass or less based on the total amount of the monomers used in the polymerization.

The polymerization catalyst is not particularly limited as long as the conjugated diene compound/α-olefin copolymer having the physical properties of the above (p1) and (p2) can be obtained, but it is preferred to use an organoaluminum compound and tri(2,2-dimethyl-1-methylpropoxy)oxyvanadium in combination. Here, examples of the organoaluminum compound include triethylaluminum, triisobutylaluminum, tri-n-hexylaluminum, diethylaluminum monochloride, diisobutylaluminum monochloride, ethylaluminum sesquichloride, butylaluminum sesquichloride, ethylaluminum dichloride, butylaluminum dichloride, aluminoxanes (e.g. methylaluminoxane, etc.), and the like. Of these, triisobutylaluminum can be preferably used.

Upon the polymerization, the use ratio of the organic aluminum compound is preferably 0.1 to 15% by mass, more preferably 0.5 to 10% by mass based on the total amount of the monomers used in the polymerization. Moreover, the use ratio of tri(2,2-dimethyl-1-methylpropoxy) oxyvanadium is preferably 0.01 to 5% by mass, more preferably 0.1 to 3% by mass based on the total amount of the monomers used in the polymerization.

The polymerization method may be any of a solution polymerization method, a vapor phase polymerization method, and a bulk polymerization method, but a solution polymerization method is preferred. As a polymerization mode, either batch one or continuous one may be used. In the case of solution polymerization, examples of the organic solvent used for polymerization include hydrocarbon solvents such as toluene, xylene, cyclohexane, and methylcyclohexane, and of these, it is preferred to use toluene. Incidentally, as the organic solvent, one kind of the above ones may be used singly or two or more kinds thereof may be used in combination. From the viewpoint of maintaining the balance between productivity and easiness of controlling the polymerization, the amount of the organic solvent to be used is preferably 200 to 3,000 parts by mass based on 100 parts by mass of the total of the monomers used in the polymerization.

The temperature of the polymerization reaction is preferably −100 to 50° C., more preferably −80 to 40° C. The polymerization reaction is preferably carried out under a pressure sufficient for maintaining the monomers substantially in a liquid phase. Such pressure can be obtained by a method of pressurizing the inside of the reactor with a gas inert to the polymerization reaction, for example.

The copolymer is preferably an alternating copolymer of the structural unit (X) and the structural units (Y). In the resultant alternating copolymer, the content ratio of the alternating chain portion of the conjugated diene compound and the α-olefin is preferably 90% by mol or more, more preferably 95% by mol or more, and further preferably 98% by mol or more. The content ratio of the alternating chain portion in the copolymer can be determined from the NMR spectrum analyzed by $^{13}$C-NMR in accordance with the method described in Non-Patent Document "Macromolecules, vol. 7, No. 6, p. 789-793". The copolymer is not limited to the alternating copolymer and may be, for example, a random copolymer, a block copolymer, a graft copolymer, or the like as long as it has the physical properties of the above (p1) and (p2).

The weight-average molecular weight (Mw) of the copolymer in terms of polystyrene as measured by gel permeation chromatography (GPC) is preferably $1.5 \times 10^3$ to $1.5 \times 10^6$, more preferably $2.0 \times 10^3$ to $1.0 \times 10^6$. The number-average molecular weight (Mn) is preferably $1.5 \times 10^3$ to $1.5 \times 10^6$, more preferably $2.0 \times 10^3$ to $1.0 \times 10^6$. The molecular weight distribution represented by the ratio of the weight-average molecular weight Mw to the average molecular weight Mn (Mw/Mn) is preferably 7.0 or less, more preferably 5.0 or less, further preferably 4.0 or less.

<Polymer Composition and Crosslinked Polymer>

(Polymer Component)

The polymer composition of the present disclosure contains the aforementioned copolymer of the present disclosure as a polymer component. The content ratio of the copolymer in the polymer composition is preferably 20% by mass or more, more preferably 30% by mass or more, further preferably 40% by mass or more based on the total amount of the polymer composition. An upper limit of the content ratio can be, for example, 99% by mass or less based on the total amount of the polymer composition.

The polymer composition may contain a polymer other than the copolymer. As such other polymer, there may be mentioned conjugated diene compound/α-olefin copolymers having no physical properties of the above (p1) and (p2), polymers different from conjugated diene compound/α-olefin copolymers (e.g., known polymers such as natural rubber, synthetic isoprene rubber, butadiene rubber, styrene-butadiene rubbers, ethylene-α-olefin copolymer rubber, acrylonitrile-butadiene copolymer rubber, chloroprene rubber, halogenated butyl rubber, styrene-isoprene copolymer rubber, and butadiene-isoprene copolymer rubber), and mixtures thereof. The blend ratio of the other polymer is preferably 30% by mass or less, more preferably 20% by mass or less, further preferably 10% by mass or less based on the total amount of the polymer components contained in the polymer composition.

(Vulcanizing Agent)

The polymer composition contains a vulcanizing agent (crosslinking agent). As the vulcanizing agent, there may be mentioned sulfur, sulfur halides, organic peroxides, quinone dioximes, organic polyvalent amine compounds, alkylphenol resins having a methylol group, and the like. As the vulcanizing agent, sulfur is usually used. The blend ratio of sulfur is preferably 0.1 to 5 parts by mass, more preferably 0.5 to 3 parts by mass based on 100 parts by mass of the total amount of the polymer components contained in the polymer composition.

The polymer composition may contain various additives and the like that are commonly used in the rubber industry in a range where the effects of the present disclosure are not impaired, in addition to the components described above. Examples of such additives include antiaging agents, zinc white, stearic acid, extender oils, softeners, sulfur, vulcanization accelerators, antioxidants, ultraviolet absorbents, coloring agents, pigments, light stabilizers, thermal polymerization inhibitors, antifoaming agents, leveling agents, antistatic agents, surfactants, storage stabilizers, flame retardants, fillers, and the like. The blend amount thereof can be appropriately selected within a range where the effects of the present disclosure are not impaired.

The polymer composition can be produced by kneading the polymer component(s) and a crosslinking agent and also component(s) to be blended as needed using a kneader such as an open type kneader (e.g., a roll) or a closed type kneader (e.g., Banbury mixer). The polymer composition is applicable to various rubber molded products as crosslinked polymers by crosslinking (vulcanization) after molding. Specifically, it can be used as seals such as packing, gaskets, weather strips, and O-rings; interior and exterior surface materials for a variety of vehicles such as automobiles, ships, aircraft, and trains; building materials; vibration-proof rubbers for industrial machinery, equipments, and the like; various types of hoses and hose covers such as diaphragm, rolls, radiator hoses, and air hoses; belts such as power transmission belts; tire treads and sidewalls; lining; dust boots; a variety of medical equipment materials; materials for general processed products such as daily necessities, household goods and sports goods; rubber materials requiring heat resistance, such as heat-resistant packing, heat-resistant gaskets, heat-resistant O-rings, heat-resistant sealing materials, heat-resistant vibration-proof rubbers for engine mount and the like, heat-resistant hoses and hose covers, heat-resistant belts, heat-resistant lining, heat-resistant dust boots, medical equipment materials to be subjected to a heat treatment such as thermal disinfection; and the like.

EXAMPLES

The following will specifically describe the present invention based on Examples but the present invention is not limited to these Examples. Incidentally, "parts" and "%" in Examples and Comparative Examples are based on weight unless otherwise specified. Methods for measuring various physical properties of polymers are as follows.

Weight-Average Molecular Weight Mw and Number-Average Molecular Weight Mn

Under the following conditions, they were determined in terms of polystyrene using gel permeation chromatography (trade name "HLC-8320GPC EcoSEC", manufactured by Tosoh Corporation).

Column: trade name "TSK gel Multipore HXL-M" (manufactured by Tosoh Corporation)
Column temperature: 40° C.
Mobile phase; tetrahydrofuran
Flow rate; 1.0 ml/min
Sample concentration; 10 mg/20 ml
Butadiene Content and Propylene Content [% by Mol]

The content ratio [% by mol] of the butadiene structural unit to the total structural units of the polymer, and the content ratio [% by mol] of the propylene structural unit were determined from $^1$H-NMR spectrum and $^{13}$C-NMR spectrum at 400 MHz measured using deuterochloroform as a solvent in the following manner. In the following, of the butadiene structural units, the cis-1,4-bond component is expressed as a structural unit (Ubc14), the trans-1,4-bond component is expressed as a structural unit (Ubt14), and the 1,2-bond component is expressed as a structural unit (Ub12) and the propylene structural unit is expressed as a structural unit (Upp).

<$^1$H-NMR>

From the integrated values of the peaks of the following (a) to (c), the content ratio of the total of the structural unit (Ubc14) and the structural unit (Ubt14), the structural unit (Ub12), and the structural unit (Upp) in the copolymer (Ubc14+Ubt14):Ub12:Upp [molar ratio] were calculated according to the following numerical expression (1).

(a) Content of the total of the structural unit (Ubc14) and the structural unit (Ubt14): 5.36 ppm
(b) Content of the structural unit (Ub12): 4.95 ppm
(c) Content of the structural unit (Upp): 0.84 ppm

[Num. 1]

$$(Ubc14 + Ubt14):Ub12:Upp = \frac{6A^1 \cdot 3A^2}{6A^1 + 3A^2 + 4A^3} : \frac{6A^2}{6A^1 + 3A^2 + 4A^3} : \frac{4A^3}{6A^1 + 3A^2 + 4A^3}$$

(in the numerical expression (1), $A^1$ represents an integral value of the peak at 5.36 ppm. $A^2$ represents an integral value of the peak at 4.95 ppm, and $A^3$ represents an integral value of the peak at 0.84 ppm.)

<$^{13}$C-NMR>

From the integrated values of the peaks of the following (d) and (e), the content ratio of the structural unit (Ubc14) and the structural unit (Ubt14) in the copolymer Ubc14:Ubt14 [molar ratio] was calculated according to the following numerical expression (2).

(d) Content of the structural unit (Ubc14): 35.5 ppm
(e) Content of the total of the structural units (Ubt14): 41.2 ppm

[Num 2]

$$Ubc14:Ubt14 = \frac{A^4}{A^4 + A^5} : \frac{A^5}{A^4 + A^5} \quad (2)$$

(in the numerical expression (2), $A^4$ represents an integral value of the peak at 35.5 ppm and $A^5$ represents an integral value of the peak at 41.2 ppm.)

From the content ratios calculated according to the above expressions (1) and (2), the content ratios (% by mol) of individual structural units in the copolymer were calculated.

Content [% by Mol] of Butadiene-Propylene Alternating Chain Portion

In accordance with the method described in Non-Patent Document (Macromolecules, vol. 7, No. 6, p. 789-793), the content [% by mol] of the butadiene-propylene alternating chain portion in the polymer was determined from the measured values on $^{13}$C-NMR at 400 MHz.

Glass Transition Temperature Tg [° C.], Melting Point Tm [° C.] and Melting Enthalpy [J/g]

Measurement was performed using DSC (trade name "DSC Q20", manufactured by T A Instruments Japan) and they were determined from a melting curve obtained by the measurement. A sample for measurement was prepared by enclosing 5 mg of a polymer in an aluminum-made sample pan (model numbers "900786.901" and "900779.901", manufactured by T A Instruments Japan Inc.). The measurement was performed by a method in which, after the sample for measurement was retained at 200° C. for 1 minute, it was cooled to −150° C. at a rate of 10° C./min and, after retained at −150° C. for 1 minute, it was heated to 200° C. at a rate of 20° C./min. The sum of the heat absorption amount resulting from crystal melting in the process of heating from −150° C. to 200° C. was regarded as melting enthalpy and the temperature at which the heat absorption amount showed a peak was regarded as melting point.

Example 1: Synthesis of Copolymer A

After 100 mL of toluene was added at room temperature into a glass-made polymerization tube having an internal volume of 500 mL which had been subjected to nitrogen substitution, the polymerization tube was sunk in a low-temperature tank at −55° C. Then, 7.2 g of propylene and 14.0 g of butadiene were added into the polymerization tube and further 3.2 mL of a toluene solution (1 mol/L) of triisobutylaluminum and 0.7 ml/L of a toluene solution (0.5 mol/L) of tri(3,3-dimethyl-2-butoxy)oxyvanadium were added thereto, followed by performing polymerization for 3 hours. After the polymerization, the reaction was terminated by adding 2.0 mL of methanol and further, a copolymer was separated by a large amount of methanol and dried under vacuum at 60° C. to obtain a copolymer A. The yield of the obtained copolymer A was 1.2 g. The polymerization was performed plural times under the same conditions and 30 g of the copolymer A was obtained in total.

Comparative Example 1: Synthesis of Copolymer B

After 12 mL of toluene was added at room temperature into a glass-made polymerization tube having an internal volume of 500 mL which had been subjected to nitrogen substitution, the polymerization tube was sunk in a low-temperature tank at −70° C. Then, 5.4 g of propylene and 4.9 g of butadiene were added into the polymerization tube and further 2.6 mL of a toluene solution (1 mol/L) of triisobutylaluminum and 1.1 ml/L of a toluene solution (0.33 mol/L) of trincopentoxyvanadium were added thereto, followed by performing polymerization for 3 hours. After the polymerization, the reaction was terminated by adding 2.0 mL of methanol and further, a copolymer was separated by a large amount of methanol and dried under vacuum at 60° C. to obtain a copolymer B. The yield of the obtained copolymer B was 6.5 g. The polymerization was performed plural times under the same conditions and 30 g of the copolymer B was obtained in total.

Figure 2:
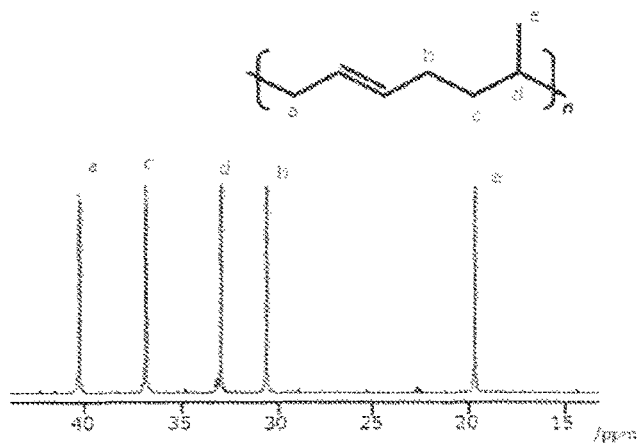
FIG. 2 $^{13}$C-NMR spectrum of the copolymer of Example.
Figure 3:
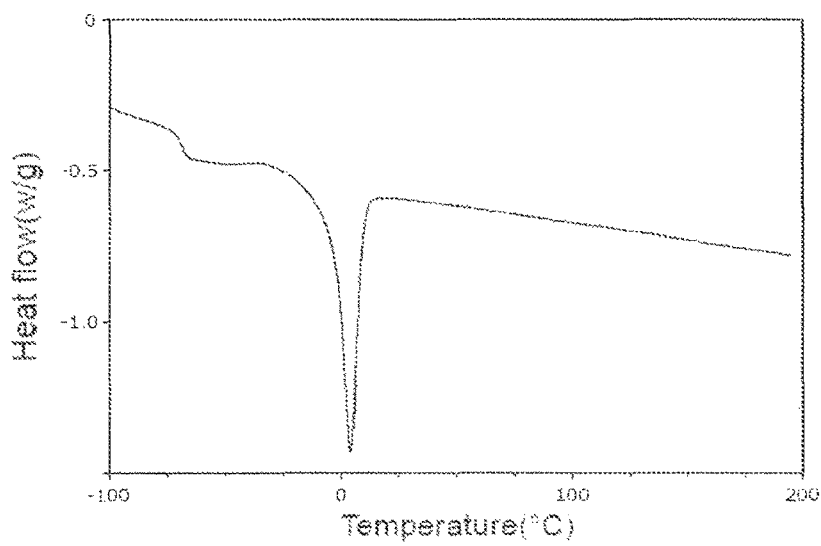
FIG. 3 DSC curve of the copolymer of Example.
Figure 4:
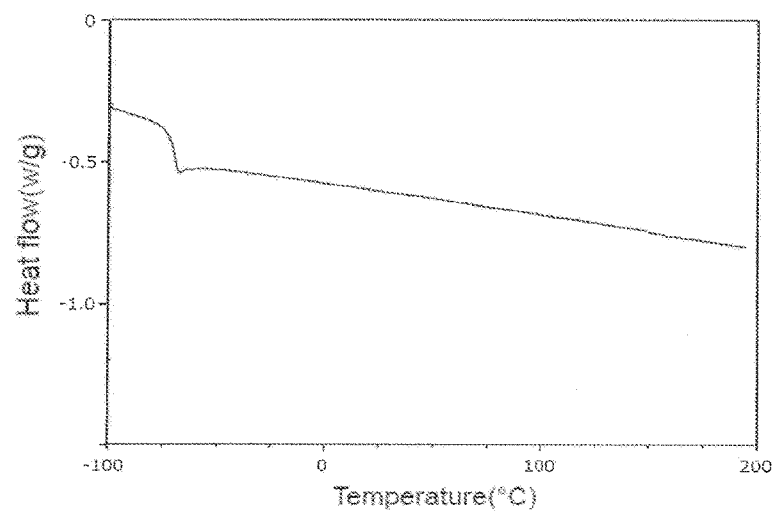
FIG. 4 DSC curve of the copolymer of Comparative Example.

Physical properties of the obtained copolymers A and B are shown in Table 1. FIG. 1 shows a $^1$H-NMR spectrum of the copolymer A obtained in Example 1 and FIG. 2 shows a $^{13}$C-NMR spectrum of the copolymer A. In addition, FIG. 3 shows a DSC curve of the copolymer A obtained in Example 1 and FIG. 4 shows a DSC curve of the copolymer B obtained in Comparative Example 1.

TABLE 1

|  |  | Example 1 | Comparative Example 1 |
|---|---|---|---|
| Copolymer |  | A | B |
| Molecular weight |  |  |  |
| Mw | (×10^3) | 15.9 | 21.8 |
| Mn | (×10^3) | 8.0 | 6.7 |
| Mw/Mn |  | 1.99 | 3.27 |
| Butadiene content |  |  |  |
| cis-1,4-bond | (mol %) | 1.3 | 0.5 |
| trans-1,4-bond | (mol %) | 48.8 | 49.6 |
| 1,2-bond | (mol %) | 0.4 | 0.4 |
| Propylene content | (mol %) | 49.5 | 49.5 |
| Butadiene-propylene alternating chain portion | (mol %) | >99.0 | >99.0 |
| Glass transition temperature | (° C.) | −69 | −69 |
| Melting point | (° C.) | 5 | — |
| Melting enthalpy | (J/g) | 27 | — |

As can be understood from the results of analysis by the NMR spectra, the copolymer A of Example 1 and the copolymer B of Comparative Example 1 were all alternating copolymers in which the content ratio of the alternating chain portion of butadiene and propylene was 99% or more. Moreover, when comparison was made on the butadiene content (cis-1,4-bond, trans-1,4-bond, and 1,2-bond) and the propylene content, a difference was not so much observed between two copolymers A and B. On the other hand, the shape of the DSC curve was considerably different between two copolymers A and B, and no melting point was observed in the copolymer B, while a melting point was observed in the copolymer A. That is, although the structural disturbance derived from butadiene (appearance of butadiene chains and 1,2-vinyl bond) and the alternating property of butadiene and propylene are considered to be equal in both of the copolymer A and the copolymer B, a melting point was observed only in the copolymer A.

Example 2: Production and Evaluation of Crosslinked Polymer

Using the copolymer A obtained in Example 1, a polymer composition was produced by blending individual components according to the blend formulation shown in the following Table 2 and kneading them. The kneading was performed by the following method. Using a 3-inch roll at 60° C., the copolymer A, stearic acid, and zinc oxide were blended and kneaded as first-step kneading. Then, using a 3-inch roll at 50° C., a vulcanization accelerator D, a vulcanization accelerator CZ, and sulfur were blended and kneaded as second-stage kneading. This was molded and then vulcanized at 160° C. for 30 minutes using a press to obtain a crosslinked polymer.

TABLE 2

| Blend formulation | parts by mass |
|---|---|
| (Co)polymer | 100 |
| Stearic acid | 2 |
| Zinc oxide | 3 |
| Vulcanization accelerator D *1) | 1.5 |
| Vulcanization accelerator CZ *2) | 1.8 |
| Sulfur | 0.3 |

*1) NOCCELER D manufactured by Ouchi Shinko Chemical Industrial Co., Ltd.
*2) NOCCELER CZ manufactured by Ouchi Shinko Chemical Industrial Co., Ltd.

Comparative Example 2: Production and Evaluation of Crosslinked Polymer

Using the copolymer B obtained in Comparative Example 1 instead of the copolymer A, a crosslinked polymer was obtained in the same manner as in Example 2.

Comparative Example 3: Production and Evaluation of Crosslinked Polymer

Using polybutadiene ("JSR BR01" manufactured by JSR Corporation) instead of the copolymer A, a crosslinked polymer was obtained in the same manner as in Example 2.

Comparative Example 4: Production and Evaluation of Crosslinked Polymer

Figure 5:
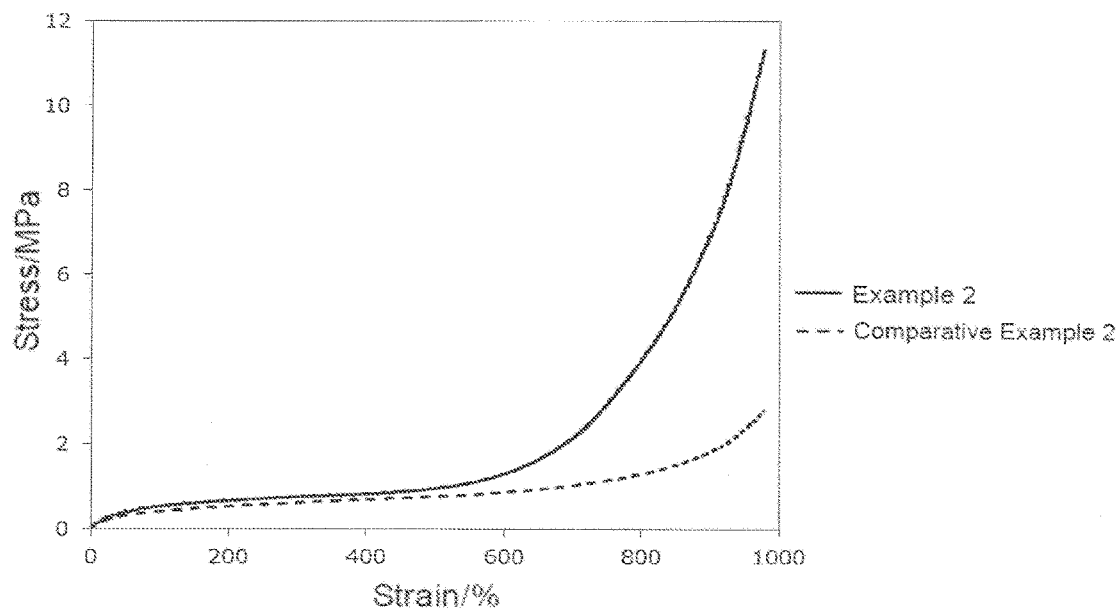
FIG. 5 Drawing showing the results of tensile tests of the copolymers of Example and Comparative Example.

Using polyisoprene ("JSR IR2200" manufactured by JSR Corporation) instead of the copolymer A, a crosslinked polymer was obtained in the same manner as in Example 2.
(Tensile Test)
Using the obtained crosslinked polymer, a tensile test was performed in accordance with JIS K6251. Using dumbbell-shaped No. 3 type one as a test sample, tensile stress (M100) at the time of 100% elongation, tensile stress (M300) at the time of 300% elongation, stress (TB) at break, and elongation at break (EB) were measured at room temperature. A larger value of TB indicates higher mechanical strength of the material and a larger value of EB indicates that elongation is larger and better. The measurement results are shown in the following Table 3. In addition, the results of Example 2 and Comparative Example 2 are also shown in FIG. 5 collectively.

TABLE 3

| | | Example 2 | Comparative Example 2 | Comparative Example 3 | Comparative Example 4 |
|---|---|---|---|---|---|
| (Co)polymer Tensile test | | Copolymer A | Copolymer B | Polybutadiene | Polyisoprene |
| M100 | (MPa) | 0.5 | 0.4 | 0.7 | 0.5 |
| M300 | (MPa) | 0.8 | 0.6 | 1.1 | 0.9 |
| TB | (MPa) | 11.1 | 2.6 | 1.9 | 9.2 |
| EB | (%) | 990 | 800 | 590 | 830 |

From the results of the tensile test, it was found that the crosslinked polymer of the copolymer A (Example 2) has large breaking strength in the tensile test, as compared to the crosslinked polymers of the copolymer B, polybutadiene, and polyisoprene (Comparative Examples 2 to 4). It is presumed that a reinforcing property (strain-induced crystallization) is exhibited by stretching in the crosslinked polymer of the conjugated diene compound/α-olefin copolymer of the present disclosure having a melting point and, as a result, the mechanical strength of the material is improved.

The invention claimed is:

1. A copolymer, comprising a structural unit derived from a conjugated diene compound and a structural unit derived from an α-olefin having 3 to 8 carbon atoms,
   wherein the copolymer is an alternating copolymer of the structural unit derived from the conjugated diene compound and the structural unit derived from the α-olefin copolymer, and
   wherein the copolymer has a melting point within a temperature range of 0 to 10° C. and has a fusion enthalpy of 5 J/g or more as measured on a differential scanning calorimeter under the following conditions:
   Conditions:
   (1) cooling from 200° C. to −150° C. at a rate of 10° C./min;
   (2) retaining at −150° C. for 1 minute; and
   (3) heating from −150° C. to 200° C. at a rate of 20° C./min.

2. A polymer composition, comprising the copolymer according to claim 1 and a crosslinking agent.

3. A crosslinked polymer obtained by crosslinking the polymer composition according to claim 2.

4. The copolymer according to claim 1, wherein the copolymer has a melting point within a temperature range of 0 to 8° C.

5. The copolymer according to claim 1, wherein the copolymer has a melting point within a temperature range of 1 to 7° C.

6. The copolymer according to claim 1, wherein the copolymer has a fusion enthalpy of 10 J/g or more.

7. The copolymer according to claim 1, wherein the copolymer has a fusion enthalpy of 15 J/g or more.

8. The copolymer according to claim 1, wherein the copolymer optionally comprises a structural unit derived from a monomer other than the conjugated diene compound or the α-olefin having 3 to 8 carbon atoms, an amount of the monomer being 10 weight % or less with respect to a total amount of monomers used in a polymerization of the copolymer.

9. The copolymer according to claim 1, wherein the copolymer optionally comprises a structural unit derived from a monomer other than the conjugated diene compound or the α-olefin having 3 to 8 carbon atoms, an amount of the monomer being 5 weight % or less with respect to a total amount of monomers used in a polymerization of the copolymer.

10. The copolymer according to claim 1, wherein the copolymer optionally comprises a structural unit derived from a monomer other than the conjugated diene compound or the α-olefin having 3 to 8 carbon atoms, an amount of the monomer being 1 weight % or less with respect to a total amount of monomers used in a polymerization of the copolymer.

* * * * *